Figure 1:
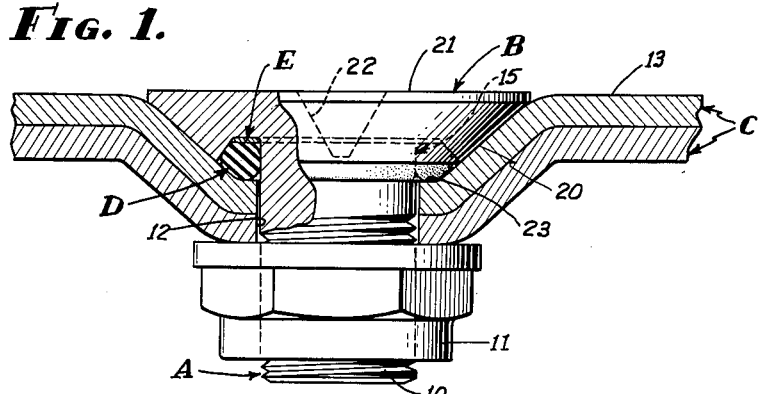

April 30, 1963 J. A. IAIA 3,087,370

BOLT WITH AN O-RING SEAL AND ANTI-FRICTION RESINOUS SHIM

Filed June 20, 1955

INVENTOR.
JOSEPH A. IAIA
BY
*Maxwell & Maxwell*
AGENTS.

United States Patent Office 3,087,370
Patented Apr. 30, 1963

3,087,370
BOLT WITH AN O-RING SEAL AND ANTI-FRICTION RESINOUS SHIM
Joseph A. Iaia, 1071 W. Arbor Vitae St., Los Angeles, Calif.
Filed June 20, 1955, Ser. No. 516,549
4 Claims. (Cl. 85—9)

This invention has to do with a fastener unit, and it is a general object of the invention to provide a fastener characterized by an elongate shank with a head thereon and with a combination of sealing elements serving to provide an effective, dependable seal between the fastener and an element engaged by the head thereof.

This application is copending with my application for Letters Patent, Ser. No. 435,407, entitled "Fastener," filed on June 9, 1954, now Patent No. 2,752,814.

Headed fasteners, such as rivets, bolts, screws, etc., are commonly applied to work, for instance, to apertured elements, and it is not uncommon to provide a sealing means to serve as a seal between the fastener and the apertured element. Sealing means have been employed that involve a simple washer of sealing or packing material and in many instances rings of packing or sealing material have been combined with rigid holders or carriers. In general, the sealing means commonly employed are in the nature of washers or inserts applied between the head of the fastener and the element secured thereby and their action generally is that characteristic of an ordinary washer. Further, sealing means of the type under consideration when applied to or when incorporated in a bolt or fastener often weaken the fastener or the installation thereof and often require increasing of the size of the head resulting in impractical constructions that are commercially impossible to use. For example, in the aircraft industry it is extremely important that the fastener retain its shear and tension characteristics without changing or materially altering the physical dimensions of the fastener.

It is an object of this invention to provide a headed fastener unit having combined therewith sealing elements that serve to effectively seal between the fastener and an element engaged thereby while the head of the fastener directly engages or seats upon the said element.

It is an object of this invention to provide a fastener unit of the character referred to that has incorporated in it features that cooperate with sealing elements all without weakening the fastener and requiring only a minimum increase in head diameter. The shearing properties of the fastener remain unaltered while the tension properties require, in practice, the use of the next head size larger, following the dimensions of standardized fasteners.

It is an object of this invention to provide a fastener of the general character referred to wherein the sealing features and elements are simple, there being a continuous channel in the head and continuous ring shaped elements acting when in service to seal off the head of the fastener and the element engaged thereby. One of the sealing elements employed is commonly referred to as an O-ring type seal.

It is another object of this invention to provide a fastener of the general character referred to wherein the head of the fastener is recessed or provided with an annular channel that carries the sealing elements and which is so related to the sealing elements as to fully house them when the fastener is applied, the elements being such that when in service, they are held under compression establishing pressure sealing engagement with the head of the fastener and with the element engaged by the fastener.

Another object of this invention is to provide a fastener of the general character referred to wherein the head of the fastener is channeled providing a plurality of walls within the head adapted to be engaged by a sealing ring so that the ring when in service has pressure sealing engagement with the head of the fastener at a plurality of spaced points while having pressure sealing engagement with the element engaged by the fastener continuously around the shank of the fastener and around the fastener receiving opening in the element.

It is another object of this invention to provide means in the form of a sealing shim that eliminates the necessity of greasing the sealing ring. It is ordinary practice to lubricate O-ring type seals in applications of the type under consideration in order to prevent galling of the ring or sealing element when the fastener is installed. That is, when a fastener such as a screw or bolt is rotated the frictional engagement between the parts ordinarily adversely affects the sealing ring.

Figure 2:
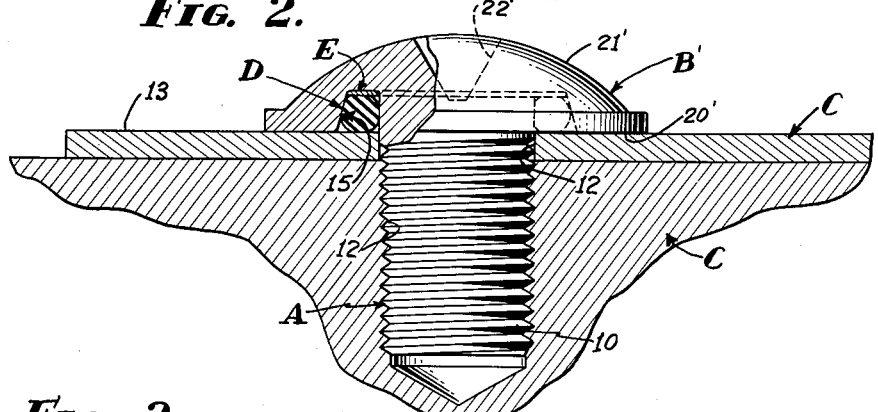
Figure 3:
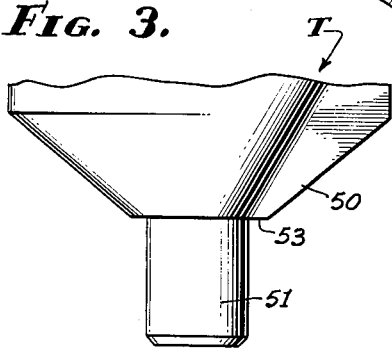
Figure 4:
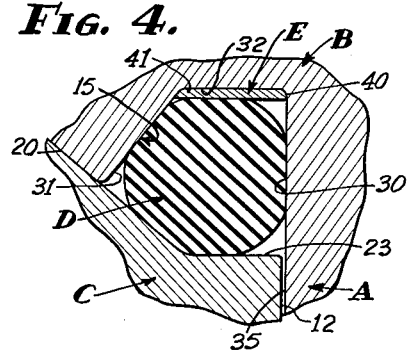
Figure 5:
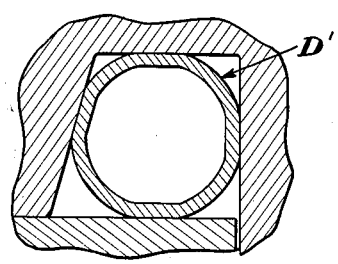

The various objects and features of my invention will be fully understood from the following detailed description of typical preferred forms and applications of my invention, throughout which description reference is made to the accompanying drawings, in which:

FIG. 1 is a side elevation of a fastener unit embodying the present invention showing the shank and head of the fastener with the sealing means related thereto and with a nut applied thereto to hold separate layers of material together. FIG. 2 is a view similar to FIG. 1 illustrating a fastener having a head of a type somewhat different from that shown in FIG. 1 and applied to a plate of material to hold it in engagement with another body of material. FIG. 3 is a view illustrating the form of cutter that I employ to countersink or recess in order to receive the type of fastener shown in FIG. 1. FIG. 4 is an enlarged sectional view illustrating the sealing features of the fastener unit shown in FIG. 1 and showing the shim and O-ring type seal that I have provided. FIG. 5 is a view similar to FIG. 4 showing a form of construction somewhat different from that illustrated in FIGS. 1 to 4.

The fastener unit provided with or embodying the present invention may be considered generally as a bolt, screw or rivet type fastened since it is characterized generally by an elongate shank A and an enlargement or head B on one end of the shank. So far as the other end of the shank is concerned, it has no bearing upon the present invention and may vary widely in form or character. For instance, when the fastener is in the nature of a bolt it may be threaded at 10 to receive a nut 11, whereas when it is in the nature of a rivet it may be headed over or of such character as to be readily headed over, etc. (not shown).

The fastener as provided by the present invention is intended to be used in connection with various elements of work, and for the purpose of illustration, the fastener is shown related to an element or elements C which are in the nature of apertured plates, the shanks A of the fasteners being shown in FIGS. 1 and 2 engaged through the apertures in the elements C. Considering the elements C in a general way, it is contemplated by the invention that they have apertures 12 or other like or corresponding features of construction for the reception of the shank of the fastener and that they have a shoulder, face, or other like surface 13 adapted to receive the head B of the fastener.

The present invention provides as elements of the combination or structure a sealing means D adapted to seal between the fastener and the element C and an anti-friction shim E to protect the means D when these parts are related as illustrated in FIGS. 1 and 2 of the drawings. In accordance with the preferred form of the invention, the sealing means D is formed by or provides a continuous annular body of sealing material in the nature of a ring formed of a suitable material, say, for instance, rubber or a rubber-like composition and preferably round in cross-sectional configuration. The invention provides a channel 15 in the head B of the fastener, and the sealing ring of means D is accommodated in the channel 15 to be under compression therein when the fastener is engaged with an element C as shown in FIGS. 1 and 2 of the drawings.

In accordance with the preferred form of the invention, the anti-friction shim E is formed by or provides a continuous annular body of anti-friction material in the nature of a ring formed of a suitable material, say for instance, a synthetic material such as a polytetrafluoroethylene commonly known as "Teflon," and preferably flat in cross-sectional configuration. The anti-friction shim E is accommodated in the channel 15 to be engaged by the sealing means D and held in pressure engagement with the bottom of the channel 15.

The shank A of the fastener may not only vary as to features of construction occurring at the portion remote from the head B, but it may, in practice, vary widely in form and extent. In the drawings, the shank A is shown as a simple, straight shank round in cross-section, and the head B is shown as integral with or in the nature of an enlargement on one end of the shank.

The head B may, in practice, vary widely in form, type or construction, and in the drawings and for the purpose of illustration, heads of several different forms or types are illustrated. In FIG. 1, the head B is shown as a simple recessed part, for instance, as a flat head such as is commonly found on bolts, screws and rivets, etc. The head B, as shown in FIG. 1 is characterized by a downwardly disposed face 20 that opposes the element C and which may be engaged with the element C.

As illustrated clearly in FIGS. 1 and 4 of the drawings, the downwardly disposed face 20 of the head B may be pitched or inclined. In this form of the invention the head B has a flat horizontally disposed top 21 normal to the longitudinal axis of the fastener and a frustoconical or inclined end face 20 that tapers downwardly and inwardly from the outer periphery of the top 21. A tool receiving socket or opening 22 is provided in the head B as shown. In this case, the element or elements C, when the parts of the fastener are related as shown, are dimpled or countersunk and the top 21 of the fastener is flush with the surface 13. In accordance with this form of the invention, the countersink in the elements C is provided with a flat annular center portion 23 in a plane normal to the axis of the fastener. The sealing means D cooperates with the portion 23 providing a seal as hereinafter described.

In the case illustrated in FIG. 2 of the drawings, the head B' is rounded or dome-shaped instead of being flat topped as shown in FIG. 1, and has a convexly rounded top 21'. In FIG. 2, the particular rounded or dome-shaped head is provided at its outer portion or periphery with a flange-like extension having a downwardly disposed face 20' that extends to the periphery or outer extremity of the flange-like extension. A tool receiving socket or opening 22' is provided in the head B'.

From the figures of the drawings and from the matters hereinabove pointed out, it is to be understood that so far as the present invention is concerned, the fastener head may be varied widely in size, shape, form or type, and in general it is merely necessary that it be of such size, shape and form as to stand the service to be incurred and that it have a face such as the face 20 or face 20' to oppose the element C which is to be engaged, while having sufficient size or mass as to accommodate the channel 15 required to receive the sealing ring D and anti-friction shim E. In practice, the head size or diameter may be increased to the next larger size, for example, from a quarter inch head size to a five-sixteenths head size, without changing the size or diameter of the fastener.

The sealing unit construction illustrated throughout the drawings, involves the channel 15 provided in the head of the fastener to receive the sealing ring D and anti-friction shim E, and is characterized by inner and outer wall 30 and 31, respectively, and by a bottom wall 32.

In accordance with the invention, the channel 15 is formed so that it is adjacent the exterior of the shank A, that is, so that it extends into or enters the head from a point where the head joins the shank. In the case under consideration, the inner wall 30 of the channel is a side wall of the channel, annular in form and of the same diameter as the shank A, and it extends into the head of the fastener from where the shank joins the head so that it is, in effect, a continuation of the outer wall 35 of the shank.

The outer wall 31 of the channel is annular in form, substantially larger in diameter than the inner wall 30 and is concentric therewith. The wall 31 enters the head of the fastener from the face 20 or 20' thereof, as the case may be, and it is substantially cylindrical in form so that it extends into the head parallel with the longitudinal axis of the fastener or shank A. The inner and outer walls 30 and 31 of the channel 15 are of corresponding extent or depth in that they extend equal amounts into the head, and the bottom 32 of the channel may be somewhat curved or cup-shaped or it may be flat. In the case illustrated, the bottom 32 is shown as a flat wall connecting or extending between the walls 30 and 31 and occurs in a plane normal to the longitudinal axis of the shank. However, it is to be understood that the channel 15 may be of any suitable cross-section, for example, it may be substantially round or substantially V-shaped.

The particular channel 15 above described includes three related walls, the inner wall 30, the outer wall 31 and the bottom wall 32. These parts are related so that the channel is substantially rectangular in cross-sectional configuration. However, it is to be understood that the outer wall of the channel may be pitched or inclined. In the case illustrated throughout the drawings, the outer wall 31 is downwardly and outwardly pitched or inclined. This channel configuration is particularly adapted to use in screw fasteners which are rotated, and by providing an inclined outer wall, the channel presents diverging side walls to the end that the sealing ring D is not pinched and is not extruded from the channel to become caught between the end face of the fastener and the element C. It will be readily understood how the sealing means D will conform to the configuration of the channel to provide an adequate seal.

The sealing ring D, in the preferred form of the invention, is a continuous annular ring of suitable sealing material, say, for example, rubber or a rubber-like composition, and it is normally round in cross-sectional configuration, and it is such that when it is initially engaged in the channel 15, it fits into the channel 15 to engage the bottom 32 thereof while contacting the inner wall 30 thereof. The ring may, in practice, be related to the shank and to the inner wall 30 of the channel 15 so that there is enough engagement between these parts to prevent the ring from leaving the channel or the shank unless it is deliberately removed therefrom.

The cross-section of the sealing ring D is of such diameter that when the ring is freely engaged in the channel, as shown in FIG. 1, it projects somewhat from the channel or from the face 20 or 20' of the head of the fastener thus establishing a projecting part which engages the element C as the fastener is applied thereto before the head of the fastener engages such element.

With the proportioning or relationship of parts just referred to, when the head of the fastener is applied to an element, such as the element C shown in FIG. 1 or FIG. 2, to seat the face 20 or 20' of the head against the surface 13 of the element C, the sealing ring D is under some compression and is confined in the channel 15. Under this condition, the sealing ring has pressure sealing contact with the surface 13 of element C where the ring is flattened more or less against the element C, and it has pressure sealing engagement with walls of the channel 15 preferably with each of the walls thereof where it is more or less flattened against the walls 30, 31, and 32 of the fastener.

With the head of the fastener channeled as hereinabove described, the face 20 or 20' of the head is removed or eliminated adjacent the shank with the result that the face 20 or 20' engageable with the element C, is an annular part concentric with shank considerably larger in diameter than the shank and spaced therefrom as illustrated in the drawings. As a result of this formation or construction, as the fastener is made tight by whatever means is provided for acting on shank to bring the face 20 or 20' into pressure engagement with element C, the engagement of the head with element C is an annular engagement, spaced from the shank and from the aperture 12 in the element C and results in a stable, effective gripping engagement between the head and the element C, and this action is in no way disturbed or impaired by a slight burring or deflection of element C such as may occur at a point such as at apertures 12, or by what might be comparable to a fillet occurring at the face of the head and the shank such as often occurs in the case of ordinary construction.

It is a feature of the present invention that I have provided an anti-friction shim E formed of "Teflon," as above referred to, or the like, and which is adapted to prevent galling of the sealing ring of the means D. When employing a sealing ring of rubber or the like, the coefficient of friction between the ring and the metallic parts of the fastener is so great that galling of the ring occurs thus spoiling the effectiveness of the seal. The shim E is provided between the bottom 32 of the channel 15 and sealing ring and is a flat ring-shaped part rectangular in cross-section and has inner and outer diameters 40 and 41 corresponding substantially to the diameter of the inner and outer walls 30 and 31, respectively, at the bottom wall 32. The shim E may be relatively thin, that is of about three-thousandths of an inch thickness when used over a shank of about one-quarter of an inch in diameter. It will be understood how the shim E slides over the shank of the fastener and how it is held in proper working position in the channel 15 behind the sealing ring.

From the foregoing, it will be apparent that I have provided an extremely simple fastener unit which incorporates means for sealing between the head of the fastener and the element engaged by the head around an aperture receiving or passing the fastener. With the structure that I have provided, a fastener assembly is provided, the elements of which, when combined, remain together as a unit unless they are forced apart. The fastener unit structure thus provided is a complete assembly ready for installation in any suitable structure and when applied to said structure the sealing ring is compressed in the channel to have pressure engagement with the walls of the channel and with the structure to which the fastener is applied. As the fastener is rotated or screwed into its final working position, the anti-friction shim E protects the sealing ring. In accordance with the invention, the coefficient of friction between the sealing ring and the shim is higher than the coefficient of friction between the shim and the bottom 32 of the channel. The shim, therefore, grips the sealing ring and slides freely in the channel.

In FIG. 3 of the drawings, I have illustrated a countersinking tool shaped to form a recess for receiving the type of fastener shown in FIG. 1 of the drawings. The tool T, as shown, includes cutting edges 50 guided by a pilot 51. The edges are angularly related or pitched to cut or form the desired recess for engaging the face 20, and in order to form the flat face adjacent the shank of the fastener and surrounding the aperture, the tool T is dressed at 53 in a plane normal to the axis of the tool. A cutting edge is formed at 53 by suitably dressing the tool.

In FIG. 5 of the drawings, I have illustrated a modified form of the invention wherein I have employed a tubular sealing ring D'. The sealing ring D' is preferably a metallic ring tubular in cross-section, for example, round. The ring D' is formed of material having substantial resiliency so that when it is compressed in working position, the sides thereof are deflected into pressure engagement with the walls of the channel and the element sealed against. In this manner, the shell of the ring D' is yieldingly urged into sealed engagement and results in a fastener unit adapted to withstand relatively high temperatures. No shim E is shown, though a shim of suitable temperature resisting material may be employed if desired, for example, a metallic shim having the desired frictional properties above referred to.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described by invention, I claim:

1. A fastener unit of the character described, adapted to be engaged in a piece of work, including, an elongate vertically disposed shank, an enlarged tool engaging head on the shank at the upper end thereof and having a downwardly disposed work engaging face, an annular channel in the head adjacent the shank and opening downwardly in the direction that the shank projects from the head, the channel having inner and outer side walls and a bottom wall opposing the work, the outer side wall being spaced from and inclined downwardly and outwardly relative to the said inner wall, an annular resilient O-ring seal engaged in the channel to occur between the side walls and having a portion normally projecting downwardly from the channel to engage and seal with the work, and an annular anti-friction shim engaged in the channel to occur between the top of the O-ring and the bottom wall of the channel, the coefficient of friction being greater between the work and the O-ring than between the shim and the O-ring whereby the fastener will rotate relative to the O-ring when the O-ring engages the work, the O-ring being smaller in cross sectional area than the combined cross sectional areas of the channel and shim and adapted to be urged into pressure sealing engagement with the work, and the side walls of the channel when the work engaging face of the head engages the work.

2. A fastener unit of the character described, adapted to be engaged in a piece of work having a flat surface including, an elongate vertically disposed shank, an enlarged tool engaging head at the upper end of the shank having a downwardly disposed work engaging face occurring in a plane normal to the longitudinal axis of the shank, an annular channel in the head adjacent the shank and opening downwardly in the direction that the shank projects from the head, the channel having inner and outer side walls and a horizontally disposed bottom wall, the inner side wall being established by the shank, the outer side wall being spaced radially outward from the inner wall, an annular resilient O-ring seal engaged in the channel to occur between the side wall and having a portion normally projecting downwardly from the channel to engage and seal with the surface of the work, and an annular shim engaged in the channel to occur between the top of the O-ring and the bottom wall of the channel, the coefficient of friction being greater between the work and the O-ring than between the shim and the O-ring whereby the fastener will rotate relative to the O-ring when the O-ring engages the surface of the work, the O-ring being smaller in cross sectional area than the combined cross sectional areas of the channel and shim and adapted to be urged into pressure sealing engagement with the surface of the work and the side walls of the channel when the work engaging face of the head engages the surface of the work, the inside diameter of the O-ring being less than the diameter of the inner wall of the channel whereby the O-ring is normally retained in the channel, the outer wall of the channel being downwardly and outwardly inclined to allow for radial outward flow of the O-ring after the seal is established and to thereby prevent extrusion of the O-ring between the work and the shank.

3. A fastener unit of the character described, and adapted to be engaged in a piece of work having a top surface, a countersink having downwardly and inwardly inclined side walls and a substantially flat horizontally disposed bottom entering the work from the top surface and a vertically disposed bore concentric with the countersink and extending into work from the bottom of the countersink including, an annular channel in the head adjacent the shank and opening downwardly in the direction in which the shank projects from the head and opposing the bottom of the countersink, the channel having inner and outer side walls and a substantially flat bottom wall, the inner side wall being established by the shank, the outer side wall being spaced radially outwardly from and inclined downwardly and outwardly relative to the inner wall, an annular resilient O-ring seal engaged in the channel to occur between the side walls and having a portion normally projecting downwardly from the channel to engage and seal with the bottom of the countersink, and an annular shim engaged in the channel to occur between the top of the O-ring and the bottom wall of the channel, the coefficient of friction being greater between the work and the O-ring than between the shim and the O-ring, whereby the fastener will rotate relative to the O-ring when the O-ring engages the work, the O-ring being smaller in cross sectional area than the combined cross sectional areas of the channel and the shim and adapted to be urged into pressure sealing engagement with the bottom of the countersink and the side walls of the channel when the work engaging face engages and seats on the side wall of the countersink, the inside diameter of the O-ring being less than the diameter of the inner wall of the channel whereby the O-ring normally yieldingly engages the said wall and is maintained in working position in the channel.

4. A fastener unit of the character described including, an elongate vertically disposed shank, an enlarged tool engaging head at the upper end of the shank and having a downwardly and inwardly inclined work engaging face adapted to engage a piece of work, an annular channel in the head adjacent the shank and opening downwardly in the direction in which the shank projects from the head and opposing the work, the channel having inner and outer side walls and a substantially flat bottom wall, the inner side wall being established by the shank, the outer side wall being spaced radially outwardly from the inner wall, an annular resilient O-ring seal engaged in the channel to occur between the side walls and having a portion normally projecting downwardly from the channel to engage and seal with the work, and an annular antifriction shim engaged in the channel to occur between the top of the O-ring and the bottom wall of the channel, the coefficient of friction being greater between the work and the O-ring than between the shim and the O-ring, whereby the fastener will rotate relative to the O-ring when the O-ring engages the surface of the work, the O-ring being smaller in cross sectional area than the combined cross sectional areas of the channel and the shim and adapted to be urged into pressure sealing engagement with the work and the side walls of the channel when the work engaging face engages and seats with the work, the inside diameter of the O-ring being less than the diameter of the inner wall of the channel whereby the O-ring normally yieldingly engages the said wall and is maintained in working position in the channel.

References Cited in the file of this patent

UNITED STATES PATENTS

| Re. 24,440 | Groen | Mar. 4, 1958 |
| 296,093 | Wells | Apr. 1, 1884 |
| 1,450,126 | Wilson | Mar. 27, 1923 |
| 1,708,736 | Pallady | Apr. 9, 1929 |
| 1,907,188 | Ransdell et al. | May 2, 1933 |
| 2,307,828 | Eggleston | Jan. 12, 1943 |
| 2,462,023 | Johanson et al. | Feb. 15, 1949 |
| 2,494,598 | Waring | Jan. 17, 1950 |
| 2,560,263 | Wiegand et al. | July 10, 1951 |
| 2,596,839 | Clausen | May 13, 1952 |
| 2,669,465 | Newell | Feb. 16, 1954 |
| 2,717,025 | Jelinek | Sept. 6, 1955 |
| 2,721,089 | Shames | Oct. 18, 1955 |
| 2,752,814 | Iaia | July 3, 1956 |

FOREIGN PATENTS

| 474,238 | Great Britain | Oct. 27, 1937 |

OTHER REFERENCES

Machine Design, September 1944, pages 119–127, article by L. S. Linderoth, Jr.

Product Engineering for June 1951, pages 130–135, article by E. L. Carlotta.